Jan. 20, 1931. J. C. BLACK 1,789,510
PROCESS OF TREATING HYDROCARBONS
Filed Aug. 1, 1928
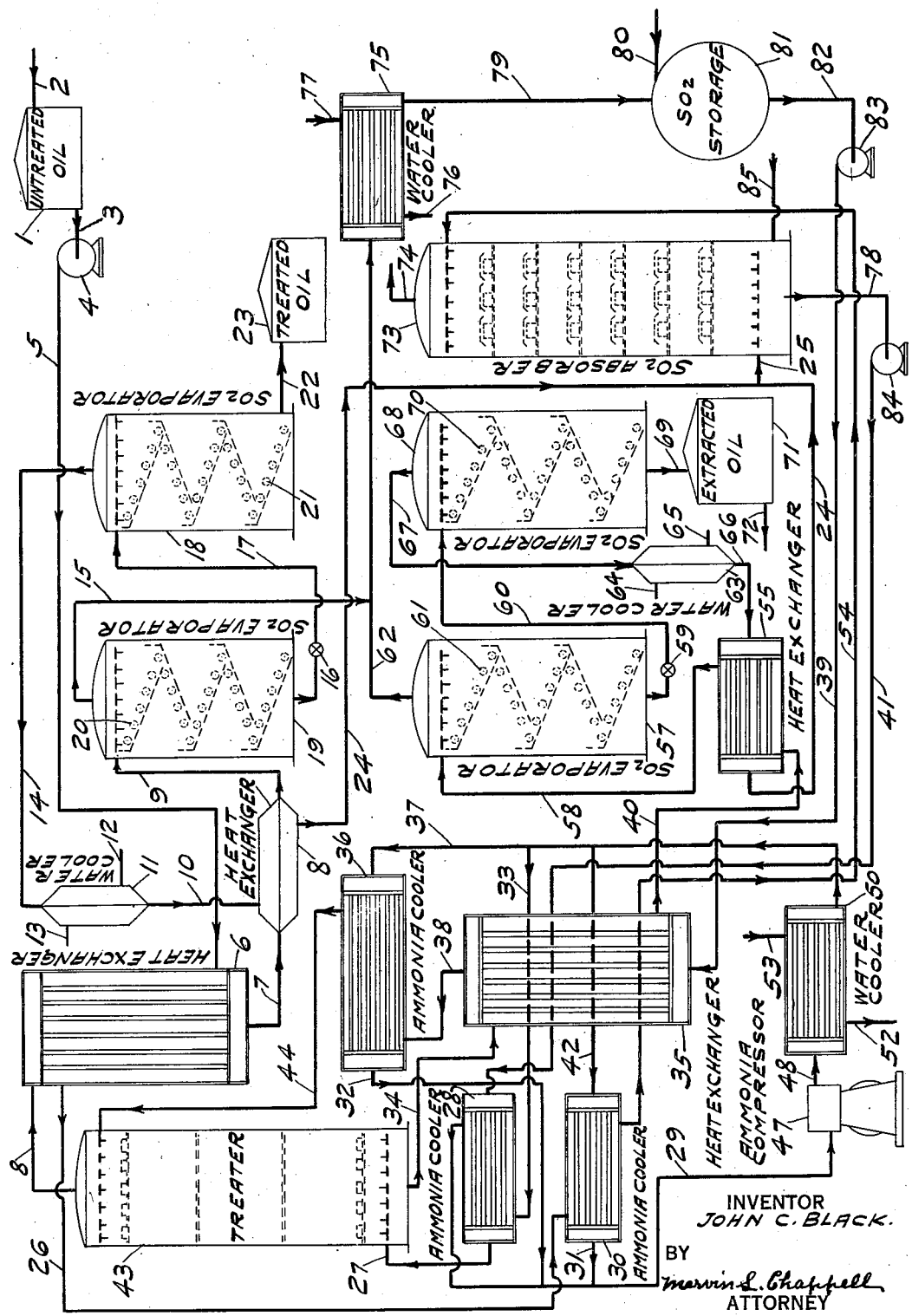
INVENTOR
JOHN C. BLACK.
BY
Marvin L. Chappell
ATTORNEY Patented Jan. 20, 1931

1,789,510

UNITED STATES PATENT OFFICE

JOHN C. BLACK, OF LOS ANGELES, CALIFORNIA

PROCESS OF TREATING HYDROCARBONS

Application filed August 1, 1928. Serial No. 296,742.

This invention relates to the purification of hydrocarbons and more specifically refers to improvements in the treatment of petroleum oil distillates with liquid sulphur dioxide at low temperatures.

By well-known methods petroleum oil distillates are treated with liquid sulphur dioxide at low temperatures and the sulphur dioxide recovered for re-use by employment of a partial distillation of the sulphur dioxide retained by the oil and the extracted oil, under pressure, and thereafter separating the remainder of the sulphur dioxide by subjecting the treated oil and extracted oil to a reduced pressure at a sufficiently elevated temperature to gasify the remaining sulphur dioxide, which after separation from the oil is liquefied by compression. By such processes the liquid sulphur dioxide employed for the treating operation is also used as a refrigerant to cool the oil and the liquid sulphur dioxide to the required low temperature, thereby requiring the evaporation and re-liquefication of large amounts of sulphur dioxide which requires the employment of specially designed compressors of large capacity, thereby involving high expenditures for equipment.

I have discovered that an economic saving may be made by the employment of a refrigerating agent other than the sulphur dioxide employed in the treating operation, such as an ammonia refrigerating system for reducing the temperature of the liquid sulphur dioxide and oil before or during the treating operation, also that a further economic saving may be made by an absorption system maintained at temperatures at or below the liquefying temperature of sulphur dioxide, by means of which the liquid sulphur dioxide retained by the treated oil and extracted oil may be recovered for re-use without the employment of a compression system.

An object of the invention is to accomplish a purification of petroleum oils by a sequence of operations, economically, without loss of the desired stock or treating agent and without the use of compression for recovering the treating agent.

Another object of the invention is to provide a continuous system for the extraction of hydrocarbons containing a low percentage of hydrogen and sulphur bearing constituents, from petroleum oil distillates containing the same, by a treatment of the petroleum oil distillate with liquid sulphur dioxide at low temperatures employing counterflow heat exchanges between the petroleum oil distillate, the treating agent and a cooling agent which has a greater refrigerating capacity than liquid sulphur dioxide.

Another object of the invention is to provide an improved method of recovering sulphur dioxide after use in the refining of petroleum oils with liquid sulphur dioxide at low temperatures, by liquefying the same at low temperatures in a cooled menstruum of the oil to be treated.

Other objects and advantages will be apparent from the following description of the preferred process which will now be more fully explained by reference to the accompanying drawing, which is a diagrammatical representation of an apparatus in which the invention may be performed.

In the drawing, 1 represents generally a tank for holding the petroleum oil to be treated. Pipe 2 connects the tank 1 to a source of untreated petroleum oil distillate not shown, by means of which tank 1 may be filled when required. A pipe 3 connects the untreated oil tank 1 to the suction side of a pump 4. A pipe 5 connects the discharge side of the pump 4 to a heat exchanger 6. A pipe 7 connects the heat exchanger 6 to a heat exchanger 8. A pipe 9 connects the heat exchanger 8 to an evaporator 19. The evaporator 19 is provided with closed steam coils 20. A pipe 10 connects the heat exchanger 8 to a water cooler 11. A pipe 12 is connected to the water cooler 11 and leads to a source of supply not shown. A pipe 13 is connected to the water cooler 11 and leads to a source of waste not shown.

A pipe 14 connects the water cooler 11 to an evaporator 18. A pipe 15 connects the evaporator 19 to a pipe 62. A pipe 17 controlled by the valve 16 connects the evaporator 19 at the bottom to evaporator 18 near the top. The evaporator 18 is provided with closed steam coils 21. A pipe 22 connects the evaporator 18 near the bottom to treated oil tank 23. A pipe 24 connects the heat exchanger 8 to a pipe 25. The pipe 25 connects the pipe 24 to a sulphur dioxide absorber 73. A pipe 26 connects the heat exchanger 6 to an ammonia cooler 30. A pipe 27 connects an ammonia cooler 28 to treater 43. A pipe 29 connects the ammonia cooler 28 to an ammonia compressor 47. A pipe 31 connects the ammonia cooler 30 to the pipe 29. A pipe 32 connects an ammonia cooler 36 to the pipe 29. A pipe 33 connects the pipe 37 to the ammonia cooler 28. A pipe 34 connects the treater 43 at the bottom to the heat exchanger 35. The pipe 37 connects a water cooler 50 to ammonia cooler 36. A pipe 38 connects the ammonia cooler 36 to heat exchanger 35. A pipe 39 connects the discharge side of a pump 83 to the heat exchanger 35. A pipe 40 connects the heat exchanger 35 to a heat exchanger 55. A pipe 41 connects the discharge side of a pump 84 to ammonia cooler 28. A pipe 42 connects the pipe 37 to ammonia cooler 30. A pipe 44 connects the ammonia cooler 36 to the treater 43 near the top, ending in a spray line and a distributor plate, as shown. A pipe 48 connects the ammonia compressor 47 to water cooler 50. A pipe 53 is connected to the water cooler 50 and leads to a source of cooling water not shown. A pipe 52 connects the water coler 50 and leads to a source of waste not shown. A pipe 54 connects the ammonia cooler 30 to sulphur dioxide absorber 73 near the top, ending in a spray line. A pipe 58 connects the heat exchanger 55 to a sulphur dioxide evaporator 57. A pipe 60 controlled by the valve 59 connects the sulphur dioxide evaporator 57 at the bottom to a second sulphur dioxide evaporator 68 near the top ending in a spray line. The evaporator 57 is provided with closed steam pipes 61. The second sulphur dioxide evaporator 68 is also provided with closed steam coils 70. A pipe 62 connects the sulphur dioxide evaporator 57 at the top to a water cooler 75. A pipe 67 connects the sulphur dioxide evaporator 68 at the top to a water cooler 63. The water cooler 63 is provided with a water inlet pipe 65 which leads to a source of cooling water not shown. A pipe 66 connects the water cooler 63 to heat exchanger 55. 64 is an outlet pipe connected to the water cooler 63 and leads to a source of waste not shown. A pipe 69 connects the sulphur dioxide evaporator 68 to an extract oil tank 71. The extract oil tank 71 is provided with an outlet pipe 72 and leads to a source of storage not shown. The pipe 74 is connected to the sulphur dioxide absorber 73 near the top and leads to an outlet source not shown. The water cooler 75 is provided with an inlet water pipe 77 which leads to a source of water supply not shown, and an outlet pipe 76 which leads to a source of waste not shown. A pipe 79 connects the water cooler 75 to a sulphur dioxide storage tank 81. A pipe 80 connects the sulphur dioxide storage tank 81 to a source of liquid sulphur dioxide not shown. A pipe 82 connects the sulphur dioxide storage tank 81 to the suction side of the pump 83. A pipe 78 connects the sulphur dioxide absorber 73 at the bottom to a pump 84. A pipe 85 connects the sulphur dioxide absorber 73 to a source of sulphur dioxide supply not shown.

The preferred process as carried out in the apparatus just described is as follows:

Petroleum oil distillate contained in the untreated oil tank 1 is caused to flow through the pipe 3 and into the suction side of pump 4 which discharges the oil to be treated through the pipe 5 and through the heat exchanger 6 in counterflow heat exchange with the outgoing cold treated oil coming from the treater 43 through the pipe 8. The untreated oil passing through the heat exchanger 6 is cooled to a temperature of approximately 50 degrees F. or lower by the outgoing cold oil, this heat exchange depending upon the temperature of the oil to be treated, the efficiency of the exchanger and the temperature of the cold treated oil, which is preferably approximately maintained at 17 degres F. in the treatment of lamp oils but may be maintained at higher temperatures in the treatment of transformer oils or lubricating oil stock. The untreated oil passes from the heat exchanger 6 through the pipe 26 and through the ammonia cooler 30 where the temperature of the oil is cooled to approximately 17 degrees F. or lower. From the ammonia cooler 30 the cooled oil to be treated at approximately 17 degrees F. or cooler passes through the pipe 54 and into the top of the sulphur dioxide absorber 73. The cold untreated oil passes through the sulphur dioxide absorber 73 and liquefies and dissolves the sulphur dioxide gas coming from the evaporators 18 and 68. The sulphur dioxide lost in the treating operation is made up by the introduction of sulphur dioxide gas through the pipe 85 which is connected to the bottom of the sulphur dioxide absorber 73, the pipe 85 leading to a source of supply of sulphur dioxide gas manufactured by any of the well-known processes. The cold untreated oil containing dissolved sulphur dioxide passes from the sulphur dioxide absorber 73 through pipe 78 and into the suction side of pump 84 which discharges the same through the pipe 41 and through a second ammonia cooler or chiller 28 where the temperature of the oil containing the dissolved sulphur dioxide from the recovery system is cooled to the desired treating temperature by an exchange of heat through a closed pipe system with ammonia. From the ammonia cooler 28 the cold untreated oil containing the dissolved liquid sulphur dioxide passes through the pipe 27 and into the bottom of treater 43, pipe 27 ending in a spray line with a distributor plate above the spray line so as to produce a uniform upward flow of the oil through the treater 43. As the oil passes up through the treater 43, liquid sulphur dioxide cooled to approximately the same temperature (17 degrees F. or lower) is introduced into the top of the treater through a spray line passing down through a distributor plate in countercurrent flow to the upcoming oil, the cold liquid sulphur dioxide being introduced in quantities sufficient to obtain the desired treatment which depends upon the stock treated and the extent of treatment desired, which may range from as low as ½ a volume per volume of oil to as high as 4 volumes of liquid sulphur dioxide per volume of oil. During the passage of the oil through the treater 43, substantially all of the unsaturated, aromatic and sulphur bearing hydrocarbons are dissolved and removed therefrom by the sulphur dioxide. The treated oil together with dissolved liquid sulphur dioxide, passes from the treater 43 through the pipe 8 and into the heat exchanger 6 wherein a counterflow heat exchange takes place between the outgoing oil and the incoming oil to be treated. From the heat exchanger 6 the treated oil containing dissolved sulphur dioxide passes through the pipe 7 and into a second heat exchanger 8 wherein a second heat exchange is effected between the outgoing treated oil containing the liquid sulphur dioxide and the sulphur dioxide gas coming from evaporator 18 and through the water cooler 11. From the heat exchanger 8 the treated oil containing dissolved sulphur dioxide passes through the pipe 9 and into the sulphur dioxide evaporator 19 which is maintained at temperatures of approximately 212 degrees F. or higher, by the steam coils 20 by means of which approximately ⅔ of the sulphur dioxide retained by the treated oil is liberated and passes off in the form of sulphur dioxide gas through the pipe 15 at a pressure of approximately 100 pounds.

The sulphur dioxide gas liberted from the treated oil in the evaporator 19 under a pressure of approximately 100 pounds or greater, passes from the pipe 15 into the pipe 62 and then through water cooler 75 which reduces the temperature sufficient to condense and liquefy the sulphur dioxide gas. The sulphur dioxide liquefied on its passage through the cooler 75 passes through the pipe 79 and into the sulphur dioxide storage tank 81 and is thereafter used again for the further treatment of petroleum oils. The treated oil still containing a small amount of dissolved sulphur dioxide passes from the evaporator 19 into pipe 17 controlled by a pressure regulating valve 16 where the pressure is reduced to approximately 10 pounds or less. The pipe 17 conducts the treated hot oil into the second evaporator 18 where further heat is applied at a pressure of approximately 10 pounds, gauge pressure or less, whereby substantially all of the sulphur dioxide contained by the oil is liberated and passes out through the top of the evaporator 18 into the pipe 14. From the pipe 14 the liberted sulphur dioxide gas passes through the water cooler 11 wherein the temperature is reduced to approximately 70 degrees F. From the water cooler 11 the sulphur dioxide gas passes through heat exhanger 8 in heat exchange with the outgoing cooler oil coming from the heat exchanger 6, wherein the temperature of the said liberted sulphur dioxide is further reduced to approximately 50 degrees F. or less. From the heat exchanger 8 the liberated sulphur dioxide gas passes through the pipe 24, pipe 25 and then into the bottom of the sulphur dioxide absorber 73 wherein the said sulphur dioxide gas is condensed and dissolved by the petroleum oil stock to be treated. From the evaporator 18 the treated oil substantially free of dissolved sulphur dioxide gas passes through the pipe 22 and into the treated oil tank 23 and may thereafter be finished by other methods known in the art.

The cold liquid sulphur dioxide containing the extracted oil passes from the treater 43 through the pipe 34 and into exchanger 35 in counterflow heat exchange with liquid sulphur dioxide coming from the storage 81. From heat exchanger 35 the liquid sulphur dioxide containing the extracted oil passes through the pipe 40 and through a second heat exchanger 55 in counterflow heat exchange with sulphur dioxide gas coming from the evaporator 68. From heat exchanger 55 the liquid sulphur dioxide containing the extracted oil passes through the pipe 58 and into the evaporator 57 wherein the liquefied sulphur dioxide and extracted oil is further heated to a temperature sufficient to gasify a high percentage of the sulphur dioxide by means of the closed steam coils 61. The evaporator 57 is maintained at a pressure of approximately 100 pounds and a temperature of approximately 212 degrees F. or higher, wherein a large percentage of the liquid sulphur dioxide is gasified and passes from the evaporator 57 through the pipe 62 and then into the water cooler 75 whereby the temperature of the gaseous liberated sulphur dioxide is reduced and liquefied at a pressure of approximately 100 pounds gauge. From the water cooler 75 the liquid sulphur dioxide passes through the pipe 79 and into the storage tank 81 and is thereafter again re-used for treating petroleum oil distillates. The extracted oil in the evaporator 57 containing approximately 4 to 10 per cent by volume dissolved sulphur dioxide, passes through the pressure regulating valve 59 and into the pipe 60, the pressure being reduced to approximately 10 pounds or a little less. From the pipe 60 the extracted oil containing the dissolved sulphur dioxide gas, passes into the evaporator 68 wherein further heat is applied sufficient to liberate and gasify substantially all of the dissolved sulphur dioxide retained by said extracted oil. The liberated sulphur dioxide gas passes from the evaporator 68 through the pipe 67 and into the water cooler 63 wherein the temperature is reduced to approximately 70 degrees F. From the water cooler 63, the sulphur dioxide gas passes through the pipe 66 and into the heat exchanger 55 where the temperature is further reduced to approximately 50 degrees F. by a heat exchange with the outgoing liquid sulphur dioxide and extracted oil coming from the heat exchanger 35, wherein the temperature of the liberated sulphur dioxide gas is further reduced. From the heat exchanger 55 the sulphur dioxide gas passes through pipe 24, pipe 25 and into the absorber 73 wherein the said liberted sulphur dioxide gas is liquefied and dissolved by the cold oil flowing therethrough, as heretofore described.

The liquefied sulphur dioxide used for the treating operation maintained in the storage tank 81 which is collected from the recovery system as heretofore described, may also be obtained from any other source known in the art for the production of liquid sulphur dioxide, and the storage tank 81 may be filled at the beginning of the operation with liquid sulphur dioxide from the pipe 80 which leads to a source of supply not shown. The liquid sulphur dioxide in storage 81 maintained under a pressure sufficient to prevent vaporization thereof, passes through the pipe 82 and into the suction side of the pump 83 which discharges the same through the pipe 39 and into the heat exchanger 35. The liquid sulphur dioxide passes through the heat exchanger 35 in counterflow heat exchange with the outgoing cool liquid sulphur dioxide containing the extracted oil from the treating operation, wherein the liquid sulphur dioxide is cooled at a temperature of approximately 50 degrees F. or a little less. From the heat exchanger 35 the liquid sulphur dioxide passes through the pipe 38 and into the ammonia cooler 36 wherein the temperature of the liquid sulphur dioxide is further reduced to a temperature of approximately 17 degrees F. From the ammonia cooler 36 the cool liquid sulphur dioxide at approximately 17 degrees F. passes through the pipe 44 and into the treater 43, the pipe 44 ending in a spray line inside the treater 43 with a distributor plate stationed below the spray line so that a uniform flow of the cool sulphur dioxide may be maintained in uniform streams or droplets in counterflow to the upcoming oil being treated.

In order to cool the oil and the liquid sulphur dioxide to the necessary low temperature, so as to obtain an efficient treatment of the oil, an ammonia cooling system is employed which may be of any of the well-known types now employed for refrigerating purposes, such as shown in the drawing in which a compressor 47 condenses the ammonia gas coming through the pipe 29 from the ammonia coolers 28, 30 and 36. The compressed ammonia gas passes from the compressor 47 through the pipe 48 and into the water cooler 50 wherein the temperature is reduced sufficiently to cause the compressed ammonia gas to liquefy. The temperature of the compressed ammonia gas is reduced to the liquefying point by cooling water which is introduced into the water cooler 50 through the pipe 53. The liquefied ammonia passes from the water cooler 50 through the pipe 37. From the pipe 37 a portion of the liquefied ammonia passes into the ammonia cooler 36, a second portion of the liquefied ammonia passes through the pipe 33 and into the ammonia cooler 28 and a third portion passes through the pipe 42 and into the ammonia cooler 30, these supplies being regulated by valves not shown so as to obtain the required cooling of the oil and sulphur dioxide to the desired degree. The ammonia gas liberated from the ammonia coolers 36, 28 and 30 is collected and returned to the compressor 47 through the pipe 29 and is again liquefied and used, continuously.

While the process herein described is well adapted for carrying out the object of the invention, it is to be understood that various changes and modifications may be made without departing from the spirit of the invention, and the invention includes all such changes and modifications as come within the scope of the appended claims.

What I claim is:

1. A process of treating hydrocarbons with liquid sulphur dioxide at low temperatures and recovering the sulphur dioxide for reuse, comprising, treating a hydrocarbon oil with liquid sulphur dioxide at low temperatures and then subjecting the treated oil containing dissolved sulphur dioxide, and the used sulphur dioxide containing the extracted oil, to separate distillation operations at temperatures above 212 degrees F. and at pressures of approximately 100 pounds gauge, to separate, condense and collect the major portion of the sulphur dioxide contained by the treated oil and the extracted oil, then vaporizing, separating, condensing and absorbing in an oil to be treated with liquid sulphur dioxide, maintained at a temperature not greater than the normal boiling temperature of sulphur dioxide, the remainder of the sulphur dioxide retained by the treated oil and extracted oil by a second distillation operation in separate containers at pressures substantially not greater than 10 pounds gauge and at temperatures above 212 degrees F.

2. A process of treating hydrocarbons with liquid sulphur dioxide at low temperatures and recovering the sulphur dioxide for re-use, comprising, treating a hydrocarbon oil at low temperatures with liquid sulphur dioxide separating the treated oil from the sulphur dioxide extract and subjecting the separated products in separate containers to distillation operations at temperatures above 212 degrees F. and under a pressure of approximately 100 pounds gauge; separating, condensing and collecting the major portion of the sulphur dioxide contained by the said products, then separating, condensing and absorbing in a hydrocarbon oil to be subsequently treated with liquid sulphur dioxide, the remainder of the sulphur dioxide contained by the said products by a second distillation operation, in separate containers, at pressures substantially not greater than 10 pounds gauge and at temperatures above 212 degrees F.

3. In the treatment of hydrocarbons with liquid sulphur dioxide at low temperatures, that step in the process of recovering the sulphur dioxide after use, comprising, continuously causing the treated product containing dissolved sulphur dioxide and the extracted product dissolved in sulphur dioxide to continuously pass through separate evaporators maintained at approximately 100 pounds pressure and at temperature above 212 degrees F., continuously vaporizing, separating, condensing and collecting under a pressure of approximately 100 pounds gauge the major portion of the sulphur dioxide contained by said treated product and said extracted product, and then vaporizing, separating, condensing and absorbing the remainder of the sulphur dioxide in a hydrocarbon oil, to be subsequently treated with liquid sulphur dioxide, at a temperature substantially not greater than the normal boiling temperature of sulphur dioxide and at pressures substantially not greater than 10 pounds, the remainder of the sulphur dioxide contained by said products.

4. A process of recovering sulphur dioxide from the products obtained in the treatment of hydrocarbons with liquid sulphur dioxide, comprising, subjecting the separated products in separate containers to a pressure distillation at a temperature sufficient to cause the major portion of the sulphur dioxide to vaporize, separating, condensing and collecting under the same pressure, the said vaporized sulphur dioxide, then vaporizing, separating, condensing and collecting in an oil cooled to the liquefying temperature of sulphur dioxide at the pressure employed, the remainder of the sulphur dioxide retained by said products by a second distillation operation in separate containers at pressures substantially not greater than 10 pounds gauge.

5. A continuous process of treating hydrocarbons with liquid sulphur dioxide and recovering the sulphur dioxide for re-use, comprising, passing an untreated hydrocarbon oil in heat exchange relationship with cold hydrocarbon oil subsequently treated with sulphur dioxide at low temperatures, continuously further cooling said untreated hydrocarbon oil by passing the same through pipe coils externally cooled by liquid ammonia to a temperature of approximately 17 degrees F.; continuously passing said cooled untreated hydrocarbon oil through an absorber in counterflow to gaseous sulphur dioxide liberated from the sulphur dioxide treated products, condensing and dissolving in the oil said gaseous sulphur dioxide liberated from the said sulphur dioxide treated products; continuously extracting the heat absorbed by the untreated cooled oil during its passage through the said absorber, by passing the same through pipe coils externally cooled with liquid ammonia, then passing said cooled untreated hydrocarbon oil containing the dissolved sulphur dioxide through a treater in counterflow to streams of liquid sulphur dioxide, cooled to approximately the same temperature, in quantities sufficient to dissolve the constituents from the untreated oil to be separated, continuously separating the liquid sulphur dioxide containing the extracted constituents from the treated oil; continuously subjecting the said separated products in separate containers to pressure distillations at temperatures sufficient to vaporize the major portion of the sulphur dioxide contained therein, separating, condensing and collecting under the same pressure, the said vaporized sulphur dioxide, then vaporizing, separating, condensing and absorbing in a hydrocarbon oil to be subsequently treated with sulphur dioxide, the remainder of the sulphur dioxide retained by said products by a second distillation operation in separate containers at pressures substantially not greater than 10 pounds gauge.

In testimony whereof I affix my signature.

JOHN C. BLACK.